May 22, 1951 H. J. LUEHRS 2,554,305
ECCENTRIC ROLLER TYPE CLUTCH
Original Filed March 17, 1943 2 Sheets-Sheet 1
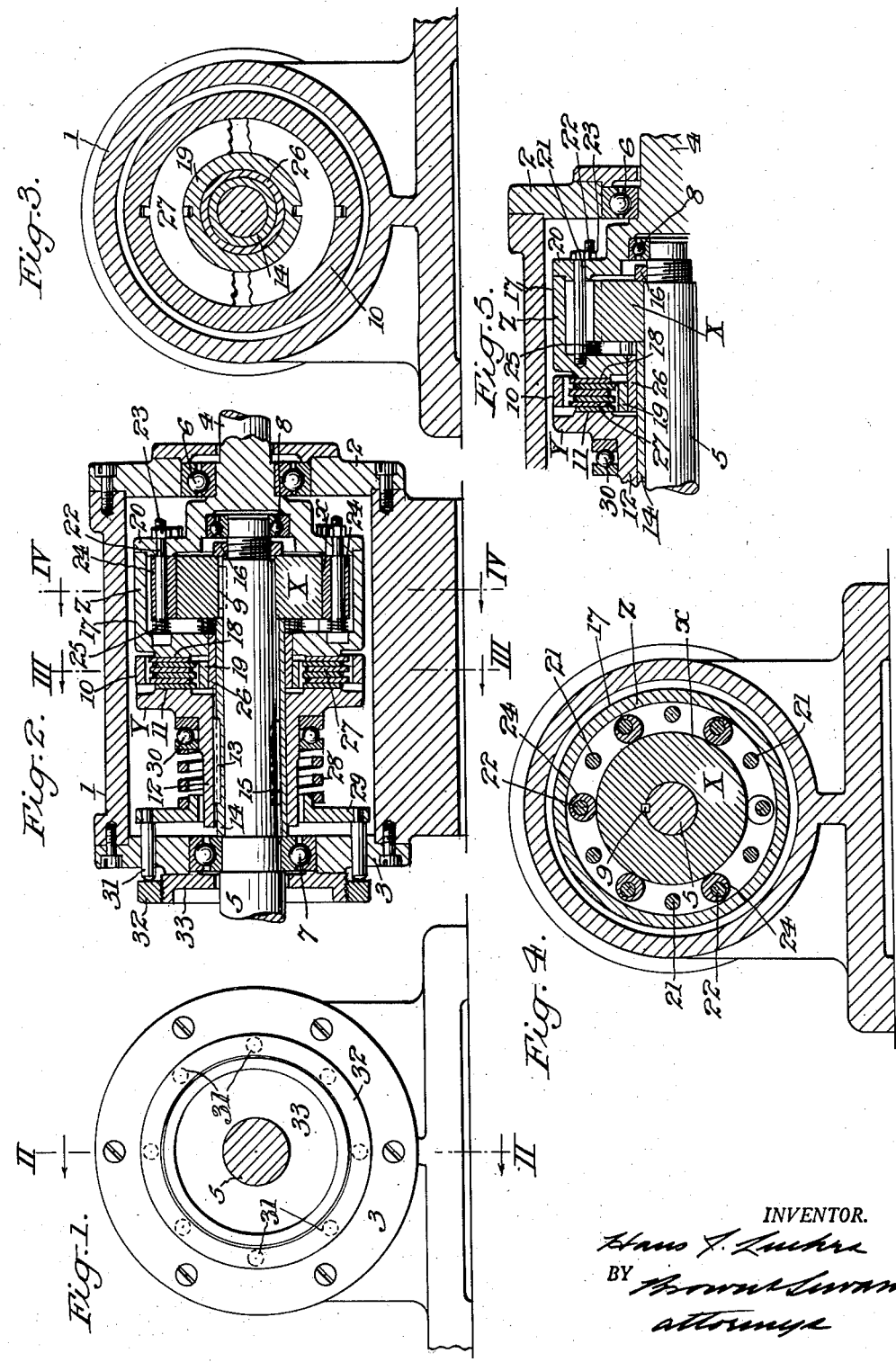
INVENTOR.
Hans J. Luehrs
BY
attorneys May 22, 1951      H. J. LUEHRS      2,554,305
ECCENTRIC ROLLER TYPE CLUTCH
Original Filed March 17, 1943      2 Sheets-Sheet 2
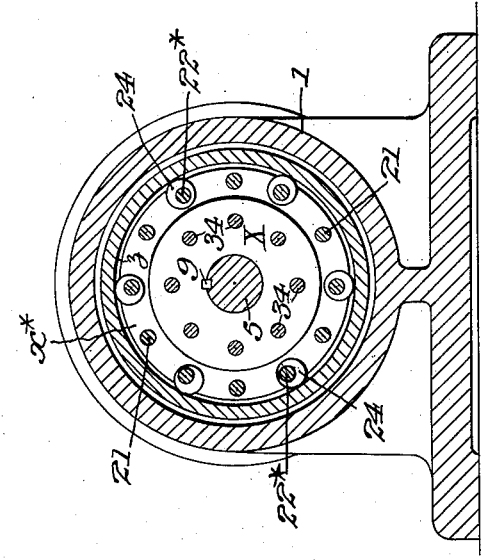
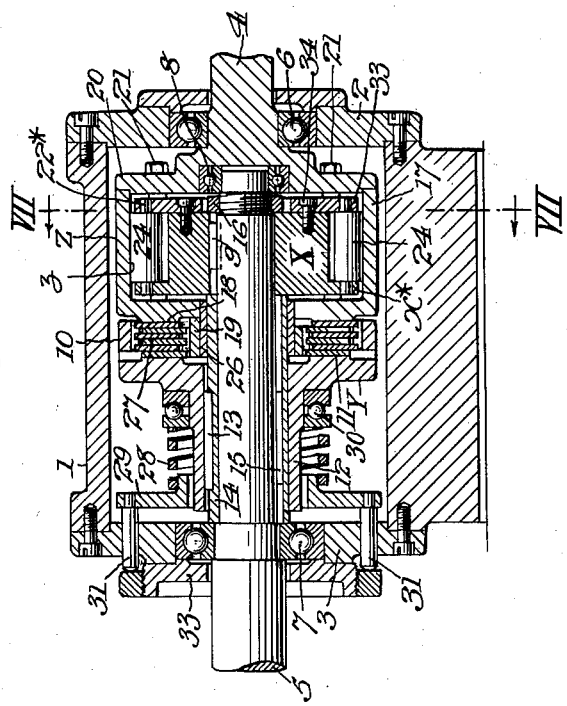
INVENTOR.

Patented May 22, 1951

2,554,305

UNITED STATES PATENT OFFICE 2,554,305

ECCENTRIC ROLLER TYPE CLUTCH

Hans J. Luehrs, Westerly, R. I., assignor to C. B. Cottrell & Sons Company, Westerly, R. I., a corporation of Delaware Original application March 17, 1943, Serial No. 479,444. Divided and this application May 18, 1945, Serial No. 594,505

5 Claims. (Cl. 192—45)

The object of my invention is to provide a clutch with means for automatically locking the rotary driving and driven elements of the clutch together when the driven element starts, under its inertia forces, to overrun the driving element when the driving element is suddenly decelerated, thereby causing the positive deceleration of the driven element with the driving element.

My invention comprises a clutch having coacting friction clutch members operably connecting the driving and driven elements of the clutch, and coacting free wheeling or one-way clutch members, automatically operable to lock the driven element thereto when the driven element starts to overrun the driving element, as, for instance, when the driving element is suddenly decelerated.

My invention more particularly comprises a combined friction and free wheeling or one-way clutch having alined drive and driven shafts and in which the friction clutch member and the free wheeling clutch member which are carried by the drive shaft are made integral to form a combined friction and free wheeling clutch member.

Practical embodiments of my invention are represented in the accompanying drawings, in which Fig. 1 represents an end view of one embodiment of the combined friction and free wheeling clutch, the driven shaft of the clutch being shown in section;

Fig. 2 represents a longitudinal section, taken in the plane of the line II—II of Fig. 1;

Fig. 3 represents a transverse section, taken in the plane of the line III—III of Fig. 2;

Fig. 4 represents a transverse section, taken in the plane of the line IV—IV of Fig. 2;

Fig. 5 represents a detail transverse section showing one of the bolts for securing the combined friction and free wheeling clutch member to the drive shaft of the clutch;

Fig. 6 represents a longitudinal section of another embodiment of my invention; and Fig. 7 represents a transverse section taken in the plane of the line VII—VII of Fig. 6.

In both of the embodiments the housing 1 for the clutch is shown as provided with removable heads 2 and 3. The clutch drive shaft 4 extends through the head 2 to the interior of the housing 1 and the alined clutch driven shaft 5 extends through the head 3 to the interior of the said housing. An anti-friction bearing 6 for the drive shaft 4 is provided in the housing head 2 and an anti-friction bearing 7 is provided for the driven shaft 5 in the housing head 3.

A third anti-friction bearing 8 may be provided between the overlapping inner ends of the drive and driven shafts 4 and 5.

The clutch is shown as including an inner free wheeling clutch member X, a spring pressed friction clutch member Y and a combined friction and free wheeling clutch member Z.

The inner free wheeling clutch member X is shown as secured on the inner end of the driven shaft 5 as by a key 9, which clutch member has a cylindrical peripheral surface $x$ concentric to the axis of the said driven shaft.

The spring pressed friction clutch member Y comprises a cup-shaped element composed of a cylindrical portion 10, a side wall 11 and a hub 12, which hub is slidably interlocked, as by a key 13 on a sleeve 14 which in turn is locked, as by a key 15 on the driven shaft 5. This sleeve 14 extends from the anti-friction bearing 7 at the head 3 into contact with one side of the inner free wheeling clutch member X. A nut 16 which is threaded on the driven shaft 5 contacts the opposite side of the inner free wheeling clutch member X for holding the sleeve and clutch member against displacement along the driven shaft 5.

The combined friction and free wheeling clutch member Z comprises a cup-shaped element composed of a cylindrical portion 17, a side wall 18 and a hub 19. This cup-shaped element of the clutch member Z is shown as secured to the flange 20 on the inner end of the drive shaft 4 as by bolts 21.

In the embodiment shown in Figs. 1 to 5 inclusive, spindles 22 project from the side wall 18 of the cup-shaped element through the flange 20 where they are threaded to receive nuts 23.

These spindles 22 form axles on which sleeves 24 having eccentric cylindrical peripheral surfaces, are rotatably mounted. Coil springs 25 surround the spindles 22 and act to yieldingly hold the eccentric outer surfaces of these sleeves 24 in light contact with the cylindrical peripheral surface of the inner free wheeling clutch member X when the driven shaft 5 is driven by the drive shaft 4 through the clutch members Y and Z. These springs 25 will assist in causing the eccentrics 24 to lock the driven shaft 5 positively to the drive shaft 4 through the clutch member Z when the driven shaft 5 starts to overrun the drive shaft 4 by the deceleration and stoppage of the said drive shaft.

A bearing ring 26 may be inserted between the sleeve 14 on the driven shaft 5 and the hub 19 of the combined friction and free wheeling clutch member Z.

A plurality of friction rings or discs 27 are shown as located edgewise between the hub 19 of the clutch member Z and the cylindrical portion 10 of the clutch member Y and also flatwise between the side wall 11 of the clutch member Y and the side wall 18 of the clutch member Z.

Very accurately adjusted pressure may be applied to the friction clutch member Y as follows: a coil spring 28 surrounds the hub 12 of the friction clutch member Y between a follower 29 and an anti-friction thrust bearing 30, the lateral flange of the follower being provided with longitudinally disposed pins 31 which project through the head 3 of the clutch housing 1 into contact with a spring pressure adjusting nut 32 threaded onto a ring plate 33 secured to the said head 3.

In the operation: the frictional pressure between the friction clutch member Y and the combined friction and free wheeling clutch member Z is accurately adjusted to points where the starting and acceleration up to the normal speed of the drive shaft 4 will cause it to correspondingly start and accelerate the driven shaft 5.

When the drive shaft 4 is suddenly decelerated, the inertia force of the driven shaft is far greater than the frictional resistance between the friction clutch members Y and Z, thereby tending to cause the overrunning of the driven shaft 5. However, as the driven shaft 5 starts to overrun the decelerating drive shaft 4, the driven shaft 5 is automatically locked to the drive shaft 4 through the coaction of the free wheeling clutch member X and the free wheeling part of the combined friction and free wheeling clutch member Z, thereby causing the driven shaft to be positively decelerated and stopped by the drive shaft.

In the embodiment shown in Figs. 6 and 7, the inner free wheeling clutch member instead of the combined friction and free wheeling clutch member carries the eccentrics which lock the two members together when the driven shaft starts to overrun the drive shaft as by the sudden deceleration of the drive shaft.

In this second embodiment the sleeve eccentrics 24 are rotatably mounted on spindles 22* which project from a circumferential flange $x^*$ at one side of the inner free wheeling clutch member X through a ring 33 secured by bolts 34 to the other side of the said inner free wheeling clutch member. These eccentrics 24 are held lightly against the concentric inner wall z of the cylindrical portion 17 of the combined friction and free wheeling clutch member Z by centrifugal action.

It will thus be seen that in this second embodiment the eccentrics 24 will act to automatically and instantly lock the inner and outer free wheeling clutch members together when the inner clutch member starts to overrun the outer clutch member.

This application is a division of my application Serial No. 479,444, filed March 17, 1943, now United States Letters Patent No. 2,411,739, dated November 26, 1946.

It is evident that various changes may be resorted to in the construction, form and arrangement of the several parts without departing from the spirit and scope of my invention, and hence I do not intend to be limited to the particular embodiments herein shown and described, but what I claim is:

1. In a clutch, a fixed housing having two heads, alined drive and driven shafts rotatively mounted in their respective heads and having overlapping inner ends rotatively mounted one on the other, the drive shaft having a flange at its inner end, an inner clutch member secured to the inner end of the driven shaft and having an unbroken concentric outer surface, an outer clutch member having a hub rotatable on the driven shaft, a side wall and a cylindrical portion having a concentric inner surface, and means for securing the drive shaft flange to the said cylindrical portion of the outer clutch member for completely enclosing the inner clutch member, spindles carried by one clutch member and eccentric sleeves rotatably mounted on said spindles in position to coact with the concentric surface of the other clutch member.

2. In a clutch, a fixed housing having two heads, alined drive and driven shafts rotatively mounted in their respective heads and having overlapping inner ends rotatively mounted one on the other, the drive shaft having a flange at its inner end, an inner clutch member secured to the inner end of the driven shaft and having an unbroken concentric outer surface, an outer clutch member having a hub rotatable on the driven shaft, a side wall and a cylindrical portion having a concentric inner surface, means for securing the drive shaft flange to the said cylindrical portion for completely enclosing the inner clutch member, spindles projecting from the side wall of the outer clutch member through the said drive shaft flange, and sleeves rotatably mounted on said spindles and having eccentric cylindrical surfaces in position to coact with said concentric outer surface of the inner clutch member.

3. In a clutch, a fixed housing having two heads, alined drive and driven shafts rotatively mounted in their respective heads and having overlapping inner ends rotatively mounted one on the other, the drive shaft having a flange at its inner end, an inner clutch member secured to the inner end of the driven shaft and having an unbroken concentric outer surface, an outer clutch member having a hub rotatable on the driven shaft, a side wall and a cylindrical portion having a concentric inner surface, means for securing the drive shaft flange to the said cylindrical portion for completely enclosing the inner clutch member, spindles projecting from the side wall of the outer clutch member through the said drive shaft flange, sleeves rotatably mounted on said spindles and having eccentric cylindrical surfaces in position to coact with said concentric outer surface of the inner clutch member and spring means on said spindles arranged to yieldingly hold the eccentric cylindrical surfaces of the said sleeves in light contact with the said concentric outer surface of the inner clutch member.

4. In a clutch, a fixed housing having two heads, alined drive and driven shafts rotatively mounted in their respective heads and having overlapping inner ends rotatively mounted one on the other, the drive shaft having a flange at its inner end, an inner clutch member secured to the inner end of the driven shaft and having an unbroken concentric outer surface, an outer clutch member having a hub rotatable on the driven shaft, a side wall and a cylindrical portion having a concentric inner surface, means for securing the drive shaft flange to the said cylindrical portion of the outer clutch member for completely enclosing the inner clutch member, spindles projecting from the side wall of the outer clutch member through the said drive shaft flange, and sleeves rotatably mounted on said spindles and having eccentric cylindrical surfaces in position to coact with said concentric outer surface of the inner clutch member and coil springs surrounding said spindles and arranged to yieldingly hold the eccentric cylindrical surfaces of the sleeves in light contact with the said concentric outer surface of the inner clutch member.

5. In a clutch, a fixed housing having two heads, alined drive and driven shafts rotatively mounted in their respective heads and having overlapping inner ends rotatively mounted one on the other, the drive shaft having a flange at its inner end, an inner clutch member secured to the inner end of the driven shaft and having an unbroken concentric outer surface, an outer clutch member having a hub rotatable on the driven shaft, a side wall and a cylindrical portion having an unbroken concentric inner surface and means for securing the drive shaft flange to the said cylindrical portion of the outer clutch member, spindles carried by the inner clutch member and sleeves rotatably mounted in said spindles and having eccentric cylindrical surfaces in position to coact with said concentric inner surface of the cylindrical portion of the outer clutch member.

HANS J. LUEHRS.

REFERENCES CITED

The following references are of record in the file of this patent:

UNITED STATES PATENTS

| Number | Name | Date |
|---|---|---|
| 280,357 | Davis et al. | July 3, 1883 |
| 397,382 | Nickerson | Feb. 5, 1889 |
| 1,310,967 | Scheiner | July 22, 1919 |
| 1,356,007 | Pasquariello | Oct. 19, 1920 |
| 2,214,602 | Arnold | Sept. 10, 1940 |
| 2,251,342 | Rauen | Aug. 5, 1941 |